United States Patent [19]

Nagaoka

[11] Patent Number: 4,998,468

[45] Date of Patent: Mar. 12, 1991

[54] BULB CENTERING CLAMP APPARATUS

[76] Inventor: Tatsuo Nagaoka, Kabushikigaisha Nagaokaseikiseisakusho c/o No. 13-12, Minowacho 2-chome, Kohoku-ku, Yokohama-shi, Kanagawa, Japan

[21] Appl. No.: 553,306

[22] Filed: Jul. 17, 1990

[30] Foreign Application Priority Data

Jan. 23, 1990 [JP] Japan .................................. 1-11881

[51] Int. Cl.$^5$ ...................... A23N 15/04; A23N 15/08
[52] U.S. Cl. ....................................... 99/636; 99/546; 99/643
[58] Field of Search ................ 99/516, 491, 546, 549, 99/550, 584, 635, 636, 637, 642, 643; 426/482, 483; 198/345, 384, 468.2; 83/251, 421, 409, 425.2, 425.4

[56] References Cited

U.S. PATENT DOCUMENTS

| 3,186,459 | 6/1965 | Van Raay | 99/636 |
| 3,373,786 | 3/1968 | Anderson et al. | 99/549 |
| 3,402,748 | 9/1968 | Olney | 99/636 |
| 3,765,320 | 10/1973 | Van Raay | 99/636 |
| 4,006,677 | 2/1977 | Vadas | 99/549 |
| 4,090,439 | 5/1978 | Chall et al. | 99/549 |
| 4,658,713 | 4/1987 | Nagaoka | 83/409 |
| 4,718,334 | 1/1988 | Nagaoka | 99/643 |

FOREIGN PATENT DOCUMENTS

| 0006186 | 1/1985 | Japan | 99/584 |
| 60-188049 | 9/1985 | Japan . | |

Primary Examiner—Timothy F. Simone
Attorney, Agent, or Firm—Lowe, Price, LeBlanc, Becker & Shur

[57] ABSTRACT

In a bulb centering clamp apparatus, a plurality of first parallel swing links are angularly movable vertically and are mounted above a rotary table rotatable about a vertical axis. A plurality of second parallel swing links are angularly movable vertically and are mounted below the rotary table in facing relation to the first swing links. An upper gripper is movable angularly in facing relation to one ends of the respective first swing links. The upper gripper has a gripping surface maintained horizontal. A lower gripper is movable angularly in facing relation to one ends of the respective second swing links. The lower gripper has a gripping surface maintained horizontal. A first cam mechanism inlcudes a pair of cam followers and a pair of stationary cams, for moving the upper and lower grippers toward and away from each other. The cam followers are provided respectively at the other ends of the respective first and second swing links and are abutted respectively against the stationary cams. A pair of side clamps are arranged between the upper and lower grippers. A second cam mechanism is provided for moving the pair of side clamps toward and away from each other. The second cam mechanism includes a stationary cam and a cam follower abutted against the stationary cam of the second cam mechanism and connected to the pair of side clamps.

11 Claims, 5 Drawing Sheets

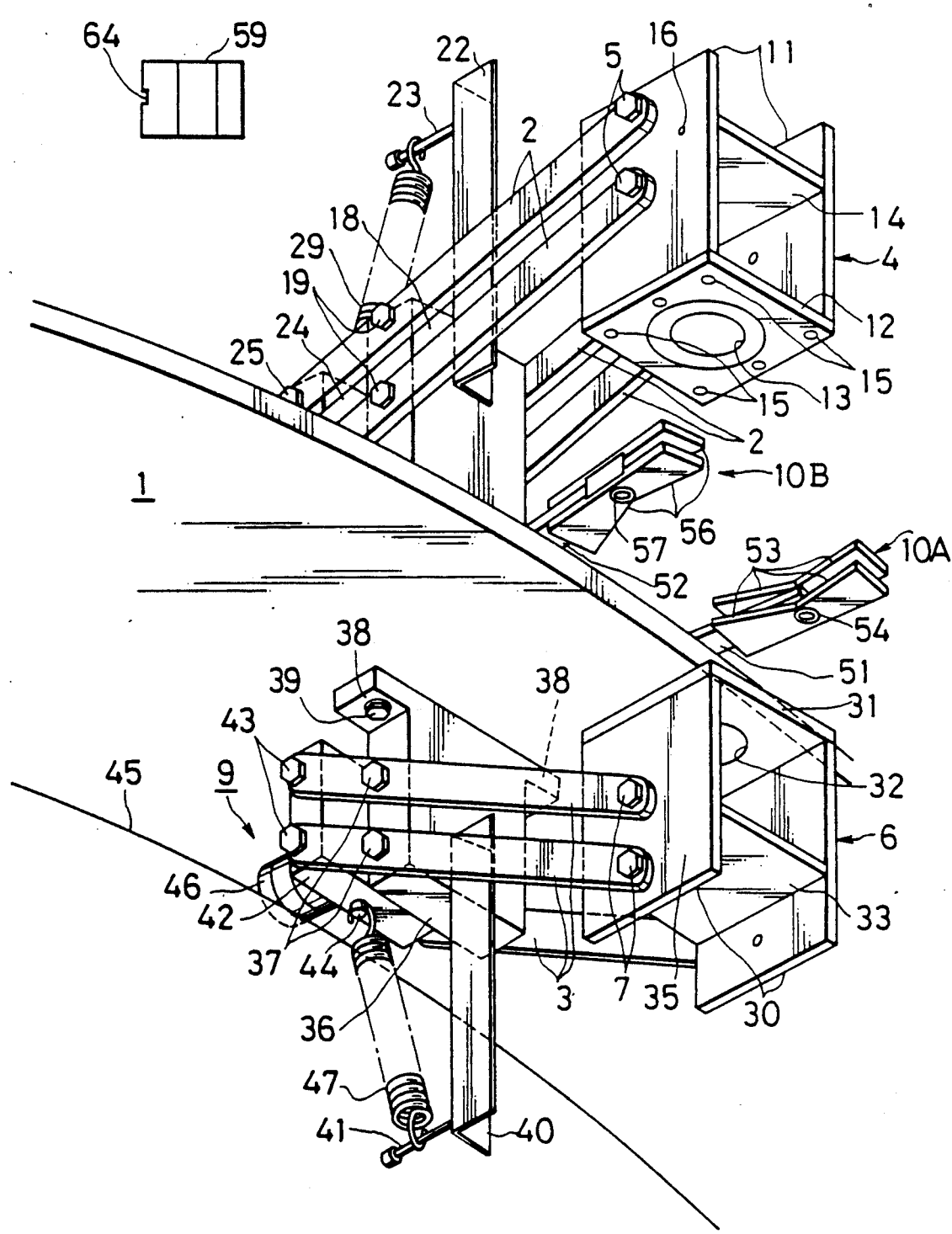

BULB CENTERING CLAMP APPARATUS

BACKGROUND OF THE INVENTION

1. Field of the Invention

The present invention relates to a bulb centering clamp apparatus for centering a bulb such as an onion, a garlic, a scallion or shallot or the like and for clamping the latter.

2. Description of the Prior Art

Generally, a bulb such as an onion, a garlic or the like has widely been used habitually as a cooking material. Prior to finely cutting the bulb, however, a stalk or stem and a root of the bulb must be cut to peel off an outer cover of the bulb at an outer periphery thereof, which is yellowish brown. If an attempt is made to process a large quantity of bulbs, the processing must rely upon a mechanical technique.

However, the bulbs are irregular or non-uniform in their dimension and configuration, unlike industrial products. Accordingly, if a cutting apparatus is constructed such that the stem and the root of the bulb are cut off with the positions of cutting edges for cutting the stem and root set fixedly, the following problem arises. That is, in the case where the upper and lower portions of the bulb are simultaneously cut off to remove the stem and the root of the bulb at both ends thereof by a single pass into the cutting apparatus, the margins of the respective calyxes of the bulb are taken excessively, depending upon the dimension and configuration of the bulb, so that the effective portion of the bulb suffers a loss or becomes insufficient. Thus, it will be required to again cut off the bulb manually or by a machine.

Particularly, if ones of the bulbs, which are insufficient in cutting-off, are sorted or selected from the bulbs after cutting, there is a fear that effects or advantages due to mechanization of the cutting operation are reduced by half.

Further, the following bulb centering apparatus has been proposed in Japanese Patent Provisional Publication No. 188049/1985. That is, in the bulb centering apparatus, a lower gripper is provided for vertical movement, and an upper gripper is provided for vertical movement in facing relation to the lower gripper.

However, the bulb centering apparatus disclosed in Japanese Patent Provisional Publication No. 188049/1985 requires a first cylinder device for moving the lower gripper upwardly and a second cylinder device for moving the upper gripper downwardly, in which the bulb is clamped between the lower and upper grippers, and is centered by the latter. Thus, an additional clamp device is required for clamping both sides of the bulb.

SUMMARY OF THE INVENTION

It is therefore an object of the invention to provide a bulb centering clamp apparatus in which a rotary table is rotated about a vertical axis whereby a plurality of first swing links and a plurality of second swing links are moved angularly in their respective directions opposite to each other by a cam mechanism during rotation of the rotary table, in which an upper gripper and a lower gripper are moved toward each other through the first and second swing links, the upper and lower grippers having their respective gripping surfaces maintained horizontal, in which a bulb is clamped between the upper and lower grippers, in which no cylinder devices like the conventional one are required for moving the upper and lower grippers toward and away from each other, in which a center of the bulb is located at a predetermined height position by the upper and lower grippers regardless of a dimension and a configuration of the bulb, in which a pair of side clamps are moved toward each other during rotation of the rotary table so that it is ensured that both sides of the center of the bulb are clamped by the side clamps, and in which the bulb under such a condition as to be clamped between the side clamps can be transported to a cutting apparatus for a stem and a root of the bulb, which is located at the subsequent step, during rotation of the rotary table.

According to the invention, there is provided a bulb centering clamp apparatus in which a plurality of first parallel swing links are arranged above a rotary table rotatable about a vertical axis, for vertically angular movement, in which a plurality of second parallel swing links are arranged below the rotary table in facing relation to the first swing links, for vertically angular movement, in which an upper gripper is provided for angular movement in facing relation to one ends of the respective first swing links such that the upper gripper has its gripper surface maintained horizontal, and a lower gripper is provided for angular movement in facing relation to one ends of the respective second swing links such that the lower gripper has its gripper surface maintained horizontal, in which a cam mechanism is so arranged that cam followers provided respectively at the other ends of the respective first and second swing links are abutted respectively against first and second stationary cams to move the upper and lower grippers toward and away from each other, and in which a pair of side clamps are provided between the upper and lower grippers and are movable toward and away from each other by a third stationary cam and a third cam follower connected to the side clamps.

BRIEF DESCRIPTION OF THE DRAWINGS

FIG. 2 is a perspective view of the embodiment illustrated in FIG. 1, as viewed from the below;

FIG. 3 is a front elevational view of a rack illustrated in FIG. 1;

DETAILED DESCRIPTION OF THE PREFERRED EMBODIMENTS

Figure 1:
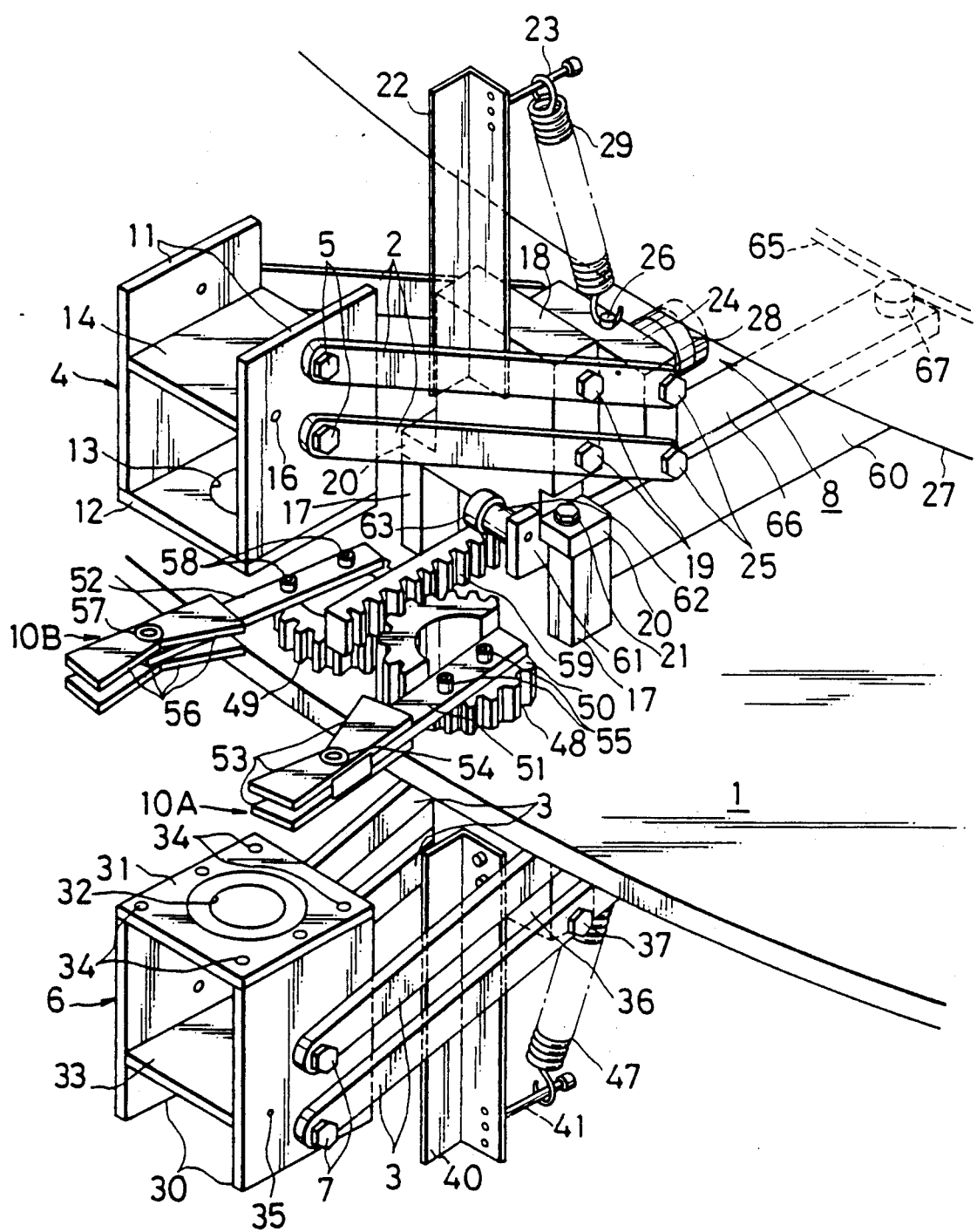
FIG. 1 is a perspective view of an embodiment of a bulb centering clamp apparatus according to the invention as viewed from the above.

Referring to FIG. 1, there is shown a rotary table 1 which is rotatable about a vertical axis. Two pairs of first parallel swing links 2 and 2 and 2 and 2, which are the same in length as each other, are arranged above the rotary table 1 for vertically angular movement. Two pairs of second parallel swing links 3 and 3 and 3 and 3, which are the same in length as each other, are arranged below the rotary table 1 for vertically angular movement in facing relation to the first swing links 2.

An upper gripper 4, whose gripping surface is maintained horizontal, is provided at one ends of the respective first swing links 2 and 2 and 2 and 2 for angular movement about respective pivots 5. A lower gripper 6, whose gripping surface is maintained horizontal, is provided at one ends of the respective second swing links 3 and 3 and 3 and 3 for angular movement about respective pivots 7 in facing relation to the upper gripper 4. A cam mechanism 8 is provided at the other ends of the respective first swing links 2 and 2 and 2 and 2 for vertically moving the upper gripper 4. As shown in FIG. 2, a cam mechanism 9 is provided at the other ends of the respective second swing links 3 and 3 and 3 and 3 for vertically moving the lower gripper 6. The cam mechanisms 8 and 9 cooperate with each other to move the upper and lower grippers 4 and 6 toward and away from each other during rotation of the rotary table 1.

A pair of side clamps 10A and 10B are arranged between the upper and lower grippers 4 and 6 for movement toward and away from each other.

As shown in FIGS. 1 and 2, the upper gripper 4 has a pair of parallel side plates 11 and 11 in spaced relation to each other. The side plates 11 and 11 have their respective lower ends at which an upper engaging plate 12 is provided. The upper engaging plate 12 has its center which is formed with a fitting bore 13. An upper end of a bulb can be fitted in the fitting bore 13. A connecting plate 14 is provided between the side plates 11 and 11 and extends in parallel relation to the upper engaging plate 12. The side plates 11 and 11 have their respective outer side surfaces at which one ends of the respective first swing links 2 are supported by the pivots 5 for angular movement thereabout.

The upper engaging plate 12 has its both side edges which are fixedly mounted to lower ends of the respective side plates 11 and 11 by a plurality of bolts 15. The connecting plate 14 has its both side edges which are fixedly mounted to the inner side surfaces of the respective side plates 11 and 11 by a plurality of bolts 16.

As shown in FIG. 1, a pair of posts 17 and 17 are arranged on an upper surface of the rotary table 1 in spaced relation to each other in an upstanding manner. A stationary plate 18 is arranged at upper portions of the respective posts 17 and 17. Sections of the respective first swing links 2 adjacent the other ends thereof are supported respectively by both side surfaces of the stationary plate 18 through respective pivots 19 for angular movement thereabout. Both sides of a section of the stationary plate 18 adjacent the lower end thereof are formed respectively with a pair of side projections 20 and 20 which project outwardly. The side projections 20 and 20 of the stationary plate 18 are fixedly mounted respectively on upper ends of the respective posts 17 and 17 by means of bolts 21.

An angle element 22 having its L-shaped cross-sectional configuration is arranged at a front face of the stationary plate 18 and projects upwardly. An anchoring pin 23 is arranged at a section of the angle element 22 adjacent the upper end thereof and projects rearwardly.

A movable plate 24 is arranged at the rear of the stationary plate 18. The other ends of the respective first swing links 2 are supported respectively by both side faces of the movable plate 24 for angular movement about respective pivots 25. A projection 26 is arranged at the upper face of the movable plate 24. A first cam consisting of an upper peripheral cam 27 is arranged above the rearward section of the movable plate 24. A cam follower 28 is arranged in the rear of the movable plate 24 and follows while being engaged with the lower face of the upper peripheral cam 27. A tension coil spring 29 is provided between the angle element 22 and the movable plate 24 for biasing the cam follower 28 toward the upper peripheral cam 27. The cam mechanism 8 comprises the upper peripheral cam 27 and the cam follower 28.

The tension coil spring 29 has one end thereof which is anchored to the anchoring pin 23 of the angle element 22 in a caught manner. The other end of the tension coil spring 29 is anchored to the projection 26 of the movable plate 24 in a caught manner.

As shown in FIGS. 1 and 2, the lower gripper 6 has a pair of parallel side plates 30 and 30 in spaced relation to each other. The side plates 30 and 30 have their respective upper ends at which a lower engaging plate 31 is provided in horizontally facing relation to the upper engaging plate 12. The lower engaging plate 31 has its center which is formed with a fitting bore 32. A lower end of the bulb can be fitted in the fitting bore 31. A connecting plate 33 is provided between the side plates 30 and 30 and extends in parallel relation to the lower engaging plate 31. The side plates 30 and 30 have their respective outer side surfaces at which one ends of the respective second swing links 3 are supported by the pivots 7 for angular movement thereabout.

The lower engaging plate 31 has its both side edges which are fixedly mounted to upper ends of the respective side plates 30 and 30 by a plurality of bolts 34. The connecting plate 33 has its both side edges which are fixedly mounted to the inner side surfaces of the respective side plates 30 and 30 by a plurality of bolts 35.

As shown in FIG. 2, a stationary plate 36 is arranged below the rotary table 1. Sections of the respective second swing links 3 adjacent the other ends thereof are supported respectively by both side surfaces of the stationary plate 36 through respective pivots 37 for angular movement thereabout. Both sides of a section of the stationary plate 36 adjacent the upper end thereof are formed respectively with side projections 38 and 38 which project outwardly. The side projections 38 and 38 of the stationary plate 36 are fixedly mounted to the lower surface of the rotary table 1 by a plurality of bolts 39.

An angle element 40 having its L-shaped cross-sectional configuration is arranged at a front face of the stationary plate 36 and projects downwardly. An anchoring pin 41 is arranged at a section of the angle element 40 adjacent the lower end thereof and projects rearwardly.

A movable plate 42 is arranged at the rear of the stationary plate 36. The other ends of the respective second swing links 3 are supported respectively by both side faces of the movable plate 42 for angular movement about respective pivots 43. A projection 44 is arranged at the lower face of the movable plate 42. A first cam consisting of a lower peripheral cam 45 is arranged above the rearward section of the movable plate 42. A cam follower 46 is arranged in the rear of the movable plate 42 and follows while being engaged with the upper face of the lower peripheral cam 45. A tension coil spring 47 is provided between the angle element 40 and the movable plate 42 for biasing the cam follower 46 toward the lower peripheral cam 45. The cam mechanism 9 comprises the lower peripheral cam 45 and the cam follower 46.

The tension coil spring 47 has one end thereof which is anchored to the anchoring pin 41 of the angle element 40 in a caught manner. The other end of the tension coil spring 47 is anchored to the projection 44 of the movable plate 42 in a caught manner.

A first spur gear 48 and a second spur gear 49 are arranged above a section of the rotary table 1 adjacent the outer peripheral edge thereof and are in mesh with each other at a location in front of the posts 17 and 17 for angular movement about respective axes extending vertically. The first spur gear 48 is formed with a cut-out 50 which extends from the upper end thereof to a position flush with the upper face of the second spur gear 49. A first support arm 51 is provided on the upper face of the cut-out 50 in the first spur gear 48. A second support arm 52 is provided on the upper face of the second spur gear 49.

The side clamp 10A comprises a pair of side clamp elements which are provided respective at upper and lower faces of a section of the first support arm 51 adjacent one end thereof. A pair of engaging sections 53 and 53 are formed at the inner side edge of each of the side clamp elements of the side clamp 10A. The pair of engaging sections 53 and 53 extend from the vicinity of the longitudinal center of the side clamp element, which corresponds to the inner side edge of the first support arm 51, toward the corners of the side clamp element at both ends thereof. The pair of engaging sections 53 and 53 are inclined in their respective directions which are opposite to each other. The pair of side clamp elements of the side clamp 10A are positioned with respect to the first support arm 51 by a support pin 54. The pair of side clamp elements of the side clamp 10A are fixedly mounted to the first support arm 51. A section of the first support arm 51 adjacent the other end thereof is fixedly mounted to the upper face of the cut-out 50 in the first spur gear 48 through a plurality of bolts 55.

The side clamp 10B comprises a pair of side clamp elements which are provided respective at upper and lower faces of a section of the second support arm 52 adjacent one end thereof. A pair of engaging sections 56 and 56 are formed at the inner side edge of each of the side clamp elements of the side clamp 10B. The pair of engaging sections 56 and 56 extend from the vicinity of the longitudinal center of the side clamp element, which corresponds to the inner side edge of the second support arm 52, toward the corners of the side clamp element at both ends thereof. The pair of engaging sections 56 and 56 are inclined in their respective directions which are opposite to each other. The pair of side clamp elements of the side clamp 10B are positioned with respect to the second support arm 52 by a support pin 57. The pair of side clamp elements of the side clamp 10B are fixedly mounted to the second support arm 52. A section of the second support arm 52 adjacent the other end thereof is fixedly mounted to the upper face of the second spur gear 49 through a plurality of bolts 58.

A rack 59 is arranged between the pair of is arranged at the inner side of one of the pair of posts 17 and 17 at a location above the second spur gear 49, and is in mesh with the first spur gear 48. The rack 59 is movable radially of the rotary table 1. A hold plate 60 extends longitudinally of the rack 59 and posts 17, which is located adjacent the first spur gear 48. The hold plate 60 has its forward end which is located below the stationary plate 18. The forward end of the hold plate 60 is formed with an upstanding section 61. A pivot 62 is provided at the inner side face of the upstanding section 61. An engaging roller 63 is mounted on the pivot 62 for rotation thereabout, and is engaged with the upper face of the rack 59.

As shown in FIG. 3, a recess-like guide groove 64 is formed on a side face of the rack 59, which is opposite to the hold plate 60. The guide groove 64 extends longitudinally of the rack 59. A plurality of pivots (not shown) are provided on the rotary table 1 at the side of the rack 59 which is opposite to the hold plate 60. A plurality of rollers (not shown) are mounted respectively on the pivots for rotation thereabout, and are engaged with the guide groove 64 in the rack 59.

A second cam consisting of a plate cam 65 is provided between the rotary table 1 and the upper peripheral cam 27. A support plate 66 is fixedly mounted to the upper face of the rack 59. The support plate 66 has its end at which a cam follower 67 is provided. The cam follower 67 follows while being engaged with the plate cam 65, and is connected to the side clamps 10A and 10B. A tension coil spring (not shown) is provided at the support plate 66 for biasing the cam follower 67 toward the plate cam 65.

The operation of the embodiment will next be described below.

Figure 4:
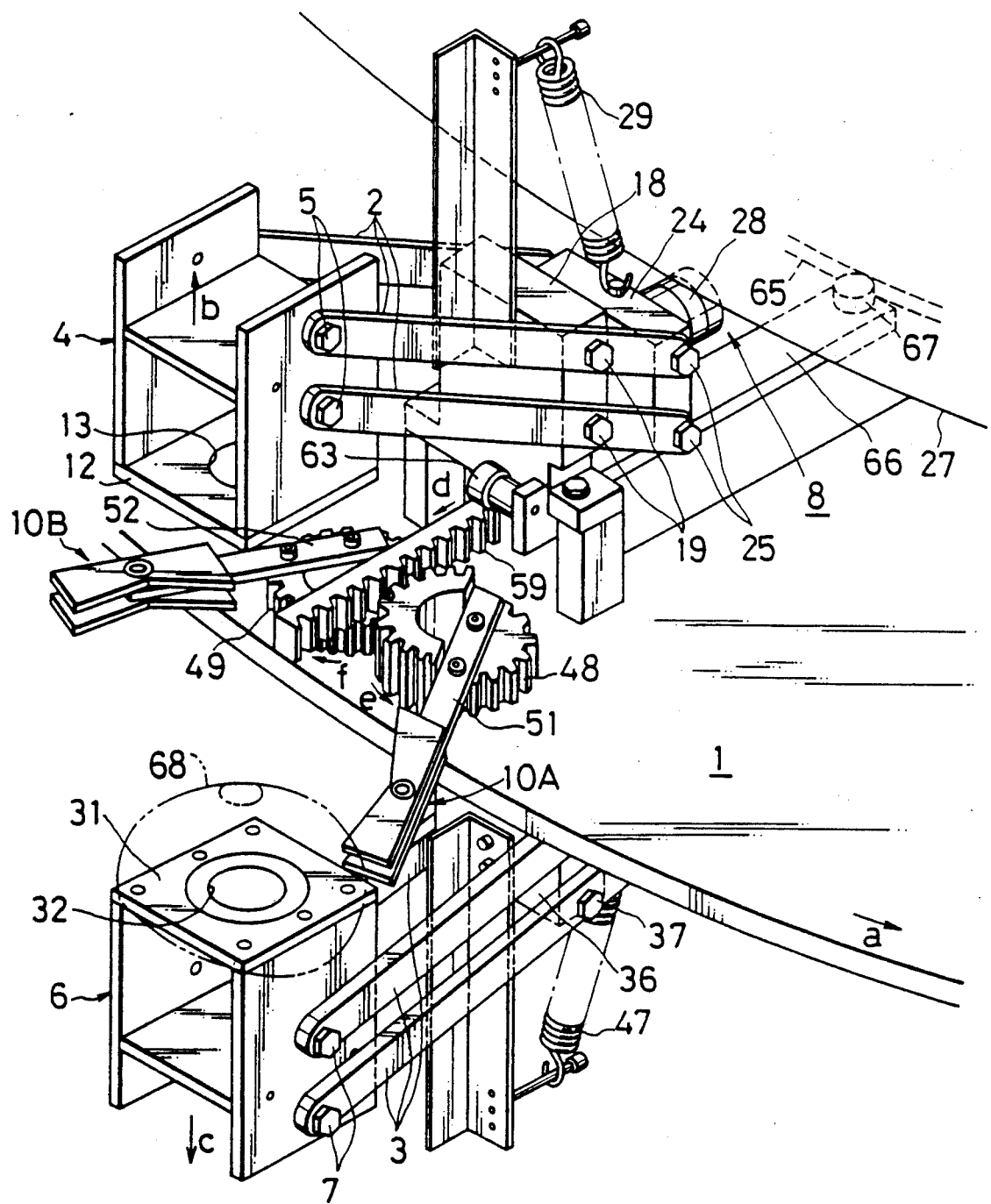
FIG. 4 is a perspective view of the bulb centering clamp apparatus illustrated in FIGS. 1 and 2, at supply of a bulb, as viewed from the above.

First, when the rotary table 1 is rotated about the vertical axis in the direction indicated by the arrow a in FIG. 4, the cam follower 28 of the movable plate 24 follows while being engaged with the upper peripheral cam 27 during rotation of the rotary table 1. The cam follower 46 of the movable plate 42 follows while being engaged with the lower peripheral cam 45 during rotation of the rotary table 1. The cam follower 67 of the support plate 66 follows while being engaged with the plate cam 65 during rotation of the rotary table 1.

By the following movement of the cam follower 28 with respect to the upper peripheral cam 27 due to rotation of the rotary table 1, the movable plate 24 is moved downwardly toward the upper face of the rotary table 1 against the tension force of the tension coil spring 29. The first swing links 2 are moved angularly about the pivots 19 of the stationary plate 18 during the downward movement of the movable plate 24. The one ends of the respective first swing links 2 are moved upwardly. The upper gripper 4 is moved in the direction indicated by the arrow b in FIG. 4 through the first swing links 2 with the upper engaging plate 12 maintained horizontal, while the upper engaging plate 12 of the upper gripper 4 faces toward the lower engaging plate 31 of the lower gripper 6.

Further, by the following movement of the cam follower 46 with respect to the lower peripheral cam 45 due to rotation of the rotary table 1, the movable plate 42 is moved upwardly toward the lower face of the rotary table 1 against the tension force of the tension coil spring 47. The second swing links 3 are moved angularly about the pivots 37 of the stationary plate 36 during the upward movement of the movable plate 42. The one ends of the respective second swing links 2 are moved downwardly. The lower gripper 6 is moved in the direction indicated by the arrow c in FIG. 4 through the second swing links 3 with the lower engaging plate 31 maintained horizontal, while the lower engaging plate 31 of the lower gripper 6 faces toward the upper engaging plate 12 of the upper gripper 4. Thus, as shown in FIG. 4, the upper and lower grippers 4 and 6 are moved vertically away from each other.

Moreover, by the following movement of the cam follower 67 with respect to the plate cam 65 due to rotation of the rotary table 1, the support plate 66 is moved toward the outer peripheral surface of the rotary table 1 against the tension force of the tension coil spring. The rack 59 is moved in the direction indicated by the arrow d in FIG. 4 while being engaged with the engaging roller 63, during outward movement of the support plate 66. The first spur gear 48 is moved angularly in the direction indicated by the arrow e in FIG. 4 while being in mesh with the rack 59. The second spur gear 49 is moved angularly in the direction indicated by the arrow f in FIG. 4 while being in mesh with the first spur gear 48. By the angular movement of the first spur gear 48, the side clamp 10A is moved away from the side clamp 10B through the first support arm 51. By the angular movement of the second spur gear 49, the side clamp 10B is moved away from the side clamp 10A through the second support arm 52. Thus, the side clamps 10A and 10B are horizontally moved away from each other.

Under such a condition illustrated in FIG. 4 that the upper and lower grippers 4 and 6 are vertically spaced or moved away from each other and the side clamps 10A and 10B are horizontally spaced or moved away from each other, an onion 68 is supplied, by a supply device (not shown), onto the lower engaging plate 31 of the lower gripper 6. The engaging bore 32 in the lower engaging plate 31 is fitted about the root of the onion 68 at the lower end thereof.

Subsequently, when the rotary table 1 is rotated about the vertical axis from the condition illustrated in FIG. 4, in the direction indicated by the arrow a in FIG. 5, the following movement of the cam follower 28 with respect to the upper peripheral cam 27 by the rotation of the rotary table 1 causes the tension force of the tension coil spring 29 to move the movable plate 24 upwardly. The first swing links 2 are moved angularly about the pivots 19 at the stationary plate 18 during the upward movement of the movable plate 24. The one ends of the respective first swing links 2 are moved downwardly. The upper gripper 4 is moved in the direction indicated by the arrow b in FIG. 5 through the first swing links 2 with the upper engaging plate 12 maintained horizontal, while the upper engaging plate 12 of the upper gripper 4 faces toward the lower engaging plate 13 of the lower gripper 6.

Further, by the following movement of the cam follower 46 with respect to the lower peripheral cam 45 due to rotation of the rotary table 1, the movable plate 42 is moved downwardly under the tension force of the tension coil spring 47. During the downward movement of the movable plate 42, the second swing links 3 are moved angularly about the pivots 37 at the stationary plate 36. The one ends of the respective second swing links 3 are moved upwardly. The lower gripper 6 is moved in the direction indicated by the arrow c in FIG. 5 through the second swing links 3 with the lower engaging plate 31 maintained horizontal, while the lower engaging plate 31 of the lower gripper 6 faces toward the upper engaging plate 12 of the upper gripper 4. The upper and lower grippers 4 and 6 are moved toward each other. The fitting bore 13 in the upper engaging plate 12 is fitted about the stem of the onion 68 at the upper end thereof.

Figure 5:
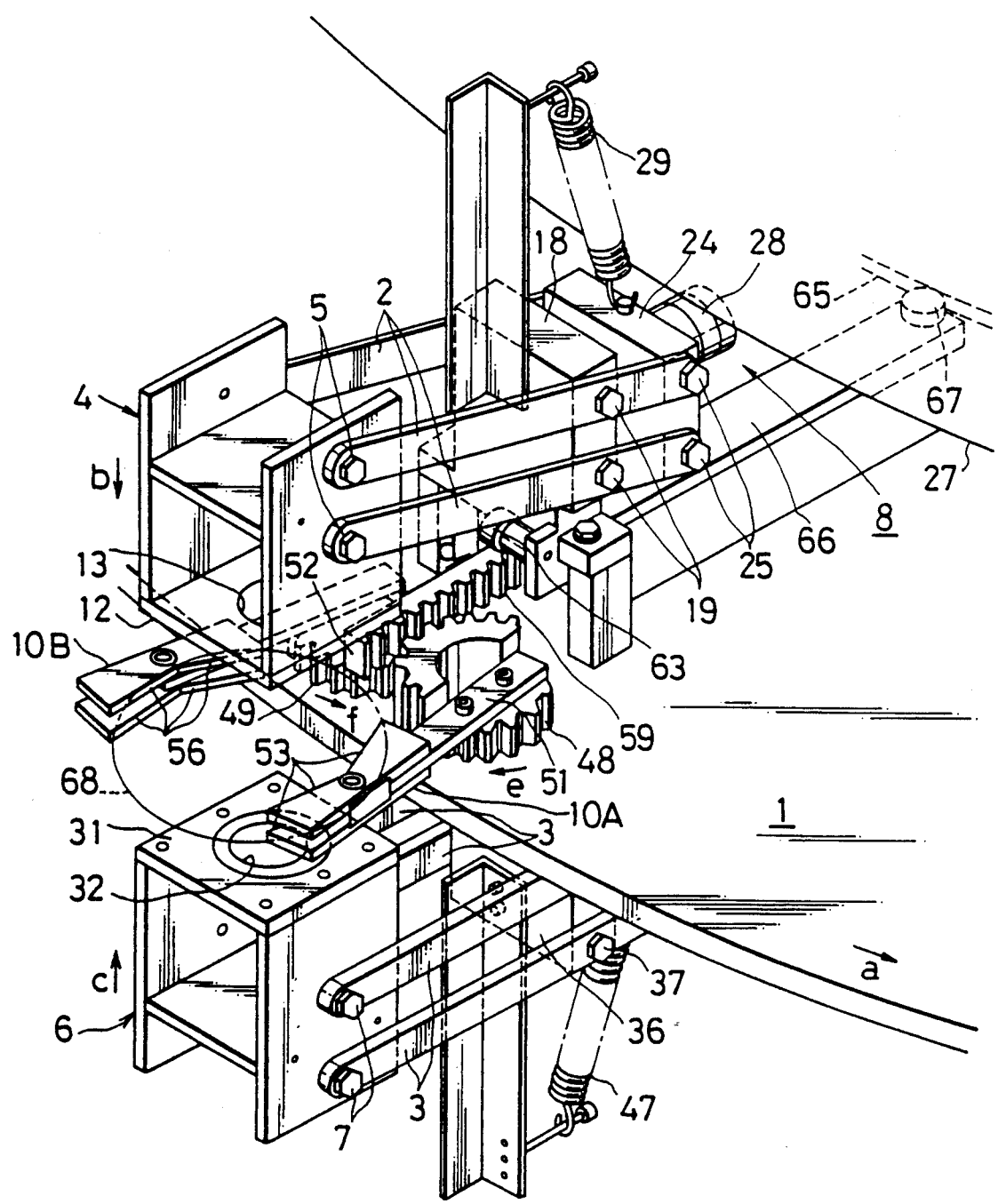
FIG. 5 is a perspective view of the bulb which is clamped among upper and lower grippers and side clamps of the bulb centering clamp apparatus illustrated in FIGS. 1 through 4, as viewed from the above.

The upper and lower grippers 4 and 6 are moved toward each other under the tension forces of the respective tension coil springs 29 and 47, whereby, as illustrated in FIG. 5, the onion 68 is clamped between the upper engaging plate 12 of the upper gripper 4 and the lower engaging plate 31 of the lower gripper 6. The center of the onion 68 is located at a predetermined height position by the upper and lower grippers 4 and 6, regardless of the dimension and configuration of the onion 68, so that the latter is centered.

Furthermore, by the following movement of the cam follower 67 with respect to the plate cam 65 due to rotation of the rotary table 1, the support plate 66 is moved toward the center of the rotary table 1 under the tension force of the tension coil spring. The rack 59 is moved in the direction indicated by the arrow d in FIG. 5 while being engaged with the engaging roller 63, during movement of the support plate 66 toward the center of the rotary table 1. The first spur gear 48 is moved angularly in the direction indicated by the arrow e in FIG. 5 while being in mesh with the rack 59. The second spur gear 49 is moved angularly in the direction indicated by the arrow f in FIG. 5 while being in mesh with the first spur gear 48. By the angular movement of the first spur gear 48, the side clamp 10A is moved toward the side clamp 10B through the first support arm 51. By the angular movement of the second spur gear 49, the side clamp 10B is moved toward the side clamp 10A through the second support arm 52. Thus, as shown in FIG. 5, the side clamps 10A and 10B are moved toward each other.

The side clamps 10A and 10B are moved toward each other under the tension force of the tension coil spring, whereby, as illustrated in FIG. 5, the onion 68 having its upper and lower ends clamped respectively by the upper and lower grippers 4 and 6 has its section at the central position, whose both sides are clamped between the side clamps 10A and 10B. The engaging sections 53 of the side clamp 10A and the engaging sections 56 of the side clamp 10B are engaged with the outer peripheral surface of the onion 68.

Subsequently, when the rotary table 1 is rotated about the vertical axis from the condition illustrated in FIG. 5, in the direction indicated by the arrow a in FIG. 6, the following movement of the cam follower 28 with respect to the upper peripheral cam 27 by the rotation of the rotary table 1 causes the movable plate 24 to be moved downwardly toward the upper face of the rotary table 1 against the tension force of the tension coil spring 29. The first swing links 2 are moved angularly about the pivots 19 at the stationary plate 18, during the downward movement of the movable plate 24. The one ends of the respective first swing links 2 are moved upwardly. The upper gripper 4 is moved in the direction indicated by the arrow b in FIG. 4 through the first swing links 2 with the upper engaging plate 12 maintained horizontal, while the upper engaging plate 12 of the upper gripper 4 faces toward the lower engaging plate 31 of the lower gripper 6.

By the following movement of the cam follower 46 with respect to the lower peripheral cam 45 due to the rotation of the rotary table 1, the movable plate 42 is moved upwardly toward the lower face of the rotary table 1 against the tension force of the tension coil spring 47. The second swing links 3 are moved angularly about the pivots 37 at the stationary plate 36 during upward movement of the movable plate 42. The one ends of the respective second swing links 3 are moved downwardly. The lower gripper 6 is moved in the direction indicated by the arrow c in FIG. 4 through the second swing links 3 with the lower engaging plate 31 maintained horizontal, while the lower engaging plate 31 of the lower gripper 6 faces toward the upper engaging plate 12 of the upper gripper 4. As shown in FIG. 4, the upper and lower grippers 4 and 6 are moved vertically away from each other. Clamping of the onion 68 by the upper and lower grippers 4 and 6 is released. The side clamps 10A and 10B are maintained clamping the both sides of the onion 68 at the central position thereof.

Figure 6:
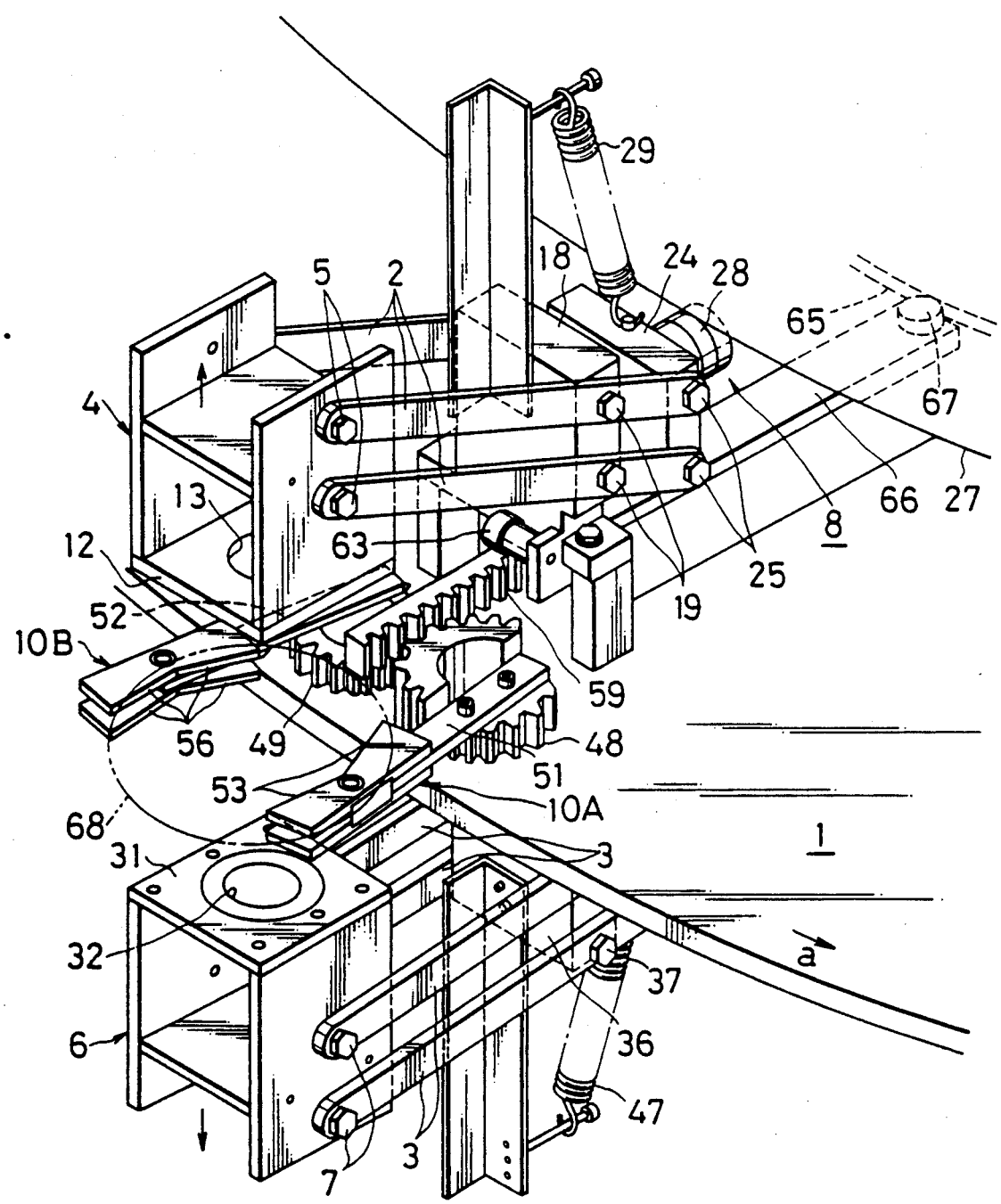
FIG. 6 is a perspective view of the bulb which is clamped between the side clamps of the bulb centering clamp apparatus illustrated in FIGS. 1 through 4, as viewed from the above.

From the condition illustrated in FIG. 6 in which the upper and lower grippers 4 and 6 are moved vertically away from each other so that clamping of the onion 68 is released and in which the side clamps 10A and 10B are moved toward each other so that the onion 68 is clamped therebetween, the rotary table 1 is rotated whereby the onion 68 is fed to a cutting apparatus (not shown) for stems and roots of bulbs, at the subsequent step. The stem and the root of the onion 68 are cut by the cutting apparatus. Subsequently, the side clamps 10A and 10B are moved away from each other so that clamping of the onion 68 having its cut stem and root is released.

In connection with the above, the cam mechanism for moving the upper and lower grippers toward and away from each other may use groove cams in place of the upper and lower peripheral cams. In this case, cam followers following along the groove cams are provided respectively at the first and second swing links. Further, covers made of elastic elements such as a synthetic resinous material, synthetic rubber or the like may be provided respectively at the inner side edges of the respective side clamps.

What is claimed is:

1. A bulb centering clamp apparatus comprising a rotary table rotatable about a vertical axis, a plurality of first parallel swing links angularly movable vertically and mounted above said rotary table, a plurality of second parallel swing links angularly movable vertically and mounted below said rotary table in facing relation to said first swing links, an upper gripper movable angularly in facing relation to one ends of the respective first swing links, said upper gripper having a gripping surface maintained horizontal, a lower gripper movable angularly in facing relation to one end of the respective second swing links, said lower gripper having a gripping surface maintained horizontal, a first cam mechanism including a first and a second cam followers and a first and a second stationary cams, for moving said upper and lower grippers toward and away from each other, said first and second cam followers being provided respectively at the other ends of the respective first and second swing links and being abutted respectively against said first and second stationary cams, a pair of side clamps arranged between said upper and lower grippers, and a second cam mechanism for moving said pair of side clamps toward and away from each other, said second cam mechanism including a third stationary cam and a third cam follower abutted against said third stationary cam and connected to said pair of side clamps.

2. The bulb centering clamp apparatus according to claim 1, wherein each of said first and second swing links includes a plurality of pairs of parallel links.

3. The bulb centering clamp apparatus according to claim 2, further comprising a pair of stationary plates mounted to said rotary table, said first and second swing links being supported respectively by said pair of stationary plates for angular movement about respective axes extending in parallel relation to said rotary table.

4. The bulb centering clamp apparatus according to claim 3, further comprising a pair of movable plates mounted respectively to said first and second swing links for angular movement about respective horizontal axes, said first and second cam followers of said first cam mechanism being mounted respectively to said pair of movable plates.

5. The bulb centering clamp apparatus according to claim 4, wherein said pair of stationary plates include their respective angle elements, and wherein said bulb centering clamp apparatus further comprises a pair of tension spring means which are provided respectively between said pair of movable plates and said angle elements.

6. The bulb centering clamp apparatus according to claim 1, further comprising a pair of spur gears in mesh with each other and a pair of support arms mounted respectively to said pair of spur gears, said side clamps being mounted respectively to said pair of support arms.

7. The bulb centering clamp apparatus according to claim 6, wherein one of said pair of spur gears has its upper face which is formed therein with a cut-out, said cut-out being provided in its height position flush with an upper face of the other spur gear.

8. The bulb centering clamp apparatus according to claim 7, further comprising a rack in mesh with said one spur gear.

9. The bulb centering clamp apparatus according to claim 8, further comprising a support plate, said rack being fixedly mounted to said support plate, wherein said third cam follower of said second cam mechanism is connected to said pair of side clamps.

10. The bulb centering clamp apparatus according to claim 9, wherein said rack has its side which is formed therein with a guide groove extending longitudinally of said rack, and wherein said bulb centering clamp apparatus further comprises a plurality of pivots provided on said rotary table and a plurality of engaging rollers provided respectively on said pivots, said engaging rollers being engaged respectively with said guide groove.

11. The bulb centering clamp apparatus according to claim 9, further comprising a hold plate arranged on the side of said rack and extending longitudinally thereof, said hold plate having an upstanding section, and an engaging roller being provided on said upstanding section of said hold plate and engaged with an upper face of said rack for rotation about an axis extending in parallel relation to an upper face of said rotary table.

* * * * *